July 3, 1956  J. R. SWARTZ  2,752,746
HACKAMORE
Filed Dec. 7, 1953
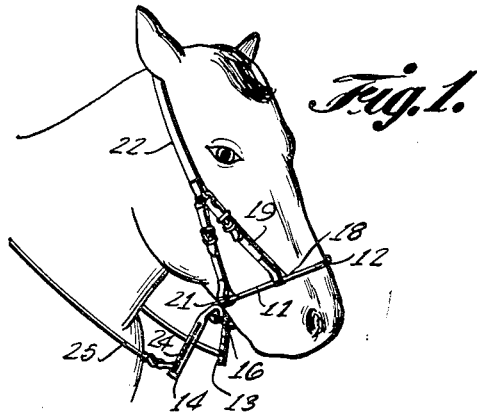
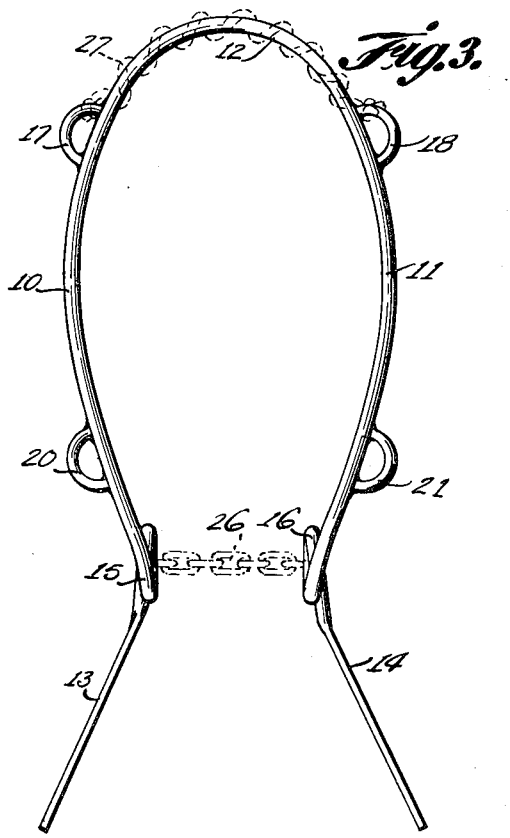
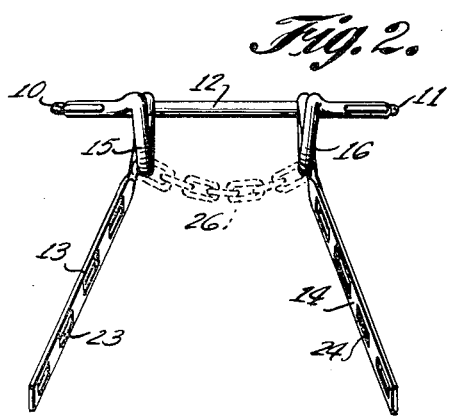
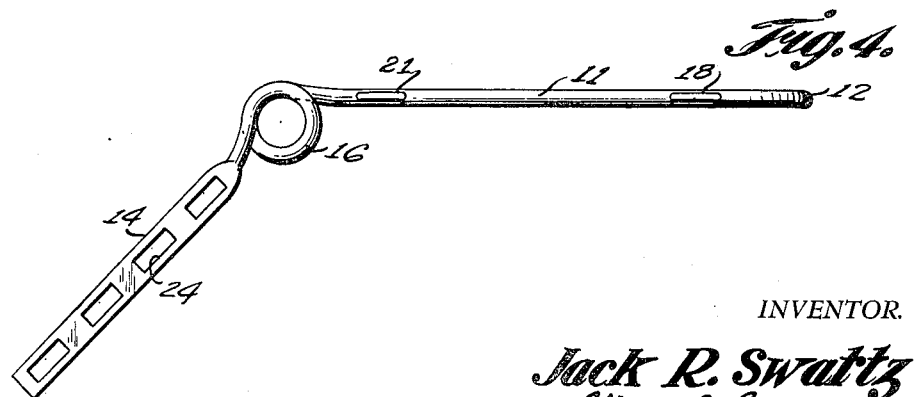
INVENTOR.
Jack R. Swartz
BY Victor J. Evans & Co.
ATTORNEYS

United States Patent Office 2,752,746
Patented July 3, 1956

2,752,746

HACKAMORE

Jack R. Swartz, Bullhead, Ariz.

Application December 7, 1953, Serial No. 396,409

1 Claim. (Cl. 54—6)

This invention relates to harness, particularly used for horses, and in particular a loop extended around the nose of a horse supported by a head stall extended over the head behind the ears and having flattened outwardly and downwardly extended shanks with elongated loops for reins therein and also having eyes between the shanks and nose portion for a strap or chain positioned below the chin.

The purpose of this invention is to provide an improved hackamore or halter that bears against the bony portion above the nostrils of a head of a horse and applies pressure to the nerves without causing soreness and without being unnecessarily uncomfortable.

Various types of halters have been provided with mouth and tongue gripping bits and other devices for holding the head of a horse, particularly in breaking a colt, however, such devices are injurious to the animal and often cause sores that make it impossible to use the horse until the sores are completely healed. With this thought in mind this invention contemplates a loop formed of material that is adapted to be patterned to correspond with the size of the head of a horse in which the loop is supported by a headstall and chin strap and is adapted to be twisted to grip the head by reins in spaced loops of extended shanks.

The object of this invention is, therefore, to provide means for forming a hackamore whereby it may readily be patterned to fit comfortably on the head of a horse and wherein pulling on reins attached to shanks extended therefrom causes pressure on nerves in the bony portion of the intermediate part of the head of the horse.

Another object of the invention is to provide an improved hackamore for effectively gripping the head of a horse without causing soreness in which the hackamore is readily adjusted to horses of different sizes.

A further object of the invention is to provide an improved hackamore or nose portion of a halter in which means is provided for attaching the reins to the hackamore at a plurality of points for adjusting the twisting action of the hackamore and in which the device is of a simple and economical construction.

With these and other objects and advantages in view the invention embodies a loop of spring material, preferably tubular, adapted to be formed to fit snugly around the intermediate portion of the head of a horse with outwardly and downwardly disposed shanks extended from ends thereof and with loops and eyes for attaching parts of a headstall and chin strap or chain thereto.

Other features and advantages of the invention will appear from the following description taken in connection with the drawing, wherein:

Figure 1 is a side elevational view illustrating the device on the head of a horse and showing the reins attached to loops in the ends of the shanks.

Figure 2 is a rear elevational view looking toward the open end of the hackamore showing the shanks with spaced slots therein extended downwardly and showing a chain connecting the ends of the loops, the chain being shown in broken lines.

Figure 3 is a plan view of the hackamore also showing a chain in broken lines and also showing a strap wrapped around the closed end of the loop in broken lines.

Figure 4 is a side elevational view of the hackamore.

Referring now to the drawing wherein like reference characters denote corresponding parts the improved hackamore of this invention includes a loop of spring material, preferably tubular having arcuate side portions 10 and 11, the ends of which are connected, at the closed end of the loop with an arcuate section 12, flat sections providing shanks 13 and 14 extended from eyes 15 and 16 on the ends of the members 10 and 11 at the open end of the loop, small loops 17 and 18 spaced from the closed end of the device for receiving bracing straps 19 of the headstall and also small loops 20 and 21 spaced from the open end of the device and positioned to receive the lower ends of the headstall 22.

The shanks 13 and 14 are provided with spaced slots 23 and 24, respectively, the slots being positioned to receive fastening elements on the ends of reins, as indicated by the numeral 25, and it will be appreciated that the pulling force is adjustable by connecting the reins to different slots in the shanks.

A chin strap or chain, as indicated by the dotted lines 26 may be connected across the eyes 15 and 16 and a strap, as indicated by the numeral 27 and as shown in dotted lines in Fig. 3 may be wrapped around the arcuate section 12 at the closed end of the device with the ends of the strap secured to the loops 17 and 18.

With the parts formed in this manner the hackamore is adapted to be used on a colt with the reins, preferably in the upper slots of the shanks, and as the colt grows the reins may be moved downwardly on the shanks and finally, to the positions at the lower ends of the shanks, as shown in Fig. 1.

The loop is readily patterned by hand to fit comfortably around the nose of a horse or colt and by pulling on the reins pressure is applied to the nerves of the bony portion of the head of a horse above the nose. The portions 10, 11 and 12 contact the nerves continuously around the head and pressure on the reins draws the head of the horse into a natural position.

It will be understood that modifications, within the scope of the appended claim, may be made in the design and arrangement of the parts without departing from the spirit of the invention.

What is claimed is:

A hackamore comprising a loop having arcuate side portions and closed with an arcuate section at one end, the ends of said side portions opposite to the ends in the closed part of the loop being coiled to form eyes and having shanks with spaced slots therein extended from said eyes, said loop having a pair of loops on each of the arcuate side portions between the closed end and the eyes.

References Cited in the file of this patent

UNITED STATES PATENTS

| 608,672 | Hammond | Aug. 9, 1898 |
| 1,734,156 | Clemens | Nov. 5, 1929 |

FOREIGN PATENTS

| 357,046 | France | Nov. 9, 1905 |
| 428,364 | France | Aug. 29, 1911 |
| 27,079 | Denmark | Jan. 10, 1921 |